(12) United States Patent
Barton (10) Patent No.: US 11,199,157 B2
(45) Date of Patent: Dec. 14, 2021

(54) EFFICIENT HEAT RECOVERY ENGINE

(71) Applicant: Capricorn Power Pty Ltd, Glen Iris (AU)

(72) Inventor: Noel Geoffrey Barton, Macquarie Park (AU)

(73) Assignee: Capricorn Power Pty Ltd, Glen Iris (AU)

( * ) Notice: Subject to any disclaimer, the term of this patent is extended or adjusted under 35 U.S.C. 154(b) by 0 days.

(21) Appl. No.: 16/636,973

(22) PCT Filed: Aug. 6, 2018

(86) PCT No.: PCT/AU2018/000129
§ 371 (c)(1),
(2) Date: Feb. 6, 2020

(87) PCT Pub. No.: WO2019/028491
PCT Pub. Date: Feb. 14, 2019

(65) Prior Publication Data
US 2021/0148305 A1    May 20, 2021

(30) Foreign Application Priority Data

Aug. 9, 2017 (AU) ................................ 2017903172
Apr. 26, 2018 (AU) ................................ 2018901380

(51) Int. Cl.
*F02G 1/044* (2006.01)
*F02C 1/10* (2006.01)
(Continued)

(52) U.S. Cl.
CPC .............. *F02G 1/044* (2013.01); *F02C 1/105* (2013.01); *F02G 1/055* (2013.01); *F02G 1/057* (2013.01)

(58) Field of Classification Search
CPC .......... F02G 1/044; F02G 1/057; F02G 1/055; F02C 1/105
(Continued)

(56) References Cited

U.S. PATENT DOCUMENTS 2,792,818 A * 5/1957 Lindstrom .............. F02B 25/00
                                                      123/71 R
4,077,221 A * 3/1978 Maeda ...................... F02G 1/04
                                                       60/517
(Continued)

FOREIGN PATENT DOCUMENTS

FR         2922608 A1    4/2009
WO     2017027480 A1    2/2017

OTHER PUBLICATIONS

International Search Report cited in PCT/AU2018/000129 dated Oct. 31, 2018, 3 pages.
(Continued)

*Primary Examiner* — Hoang M Nguyen
(74) *Attorney, Agent, or Firm* — Rothwell, Figg, Ernst & Manbeck, P.C.

(57) ABSTRACT

A heat recovery engine (5) including a compressor (15) to increase pressure, density and temperature of a gas stream flowing in a closed loop within the engine, with the gas stream at base system pressure (10) at a compressor inlet; an expander (30) to reduce the pressure of said gas stream when compressed to just above said base system pressure, at the same time receiving power from the gas stream; a recuperator (20) to transfer thermal energy from downstream gas stream of said expander (30) to downstream gas stream of said compressor (15), thereby increasing the temperature of said downstream gas stream of said compressor (15) at approximately constant pressure; a heater (25) to provide further heat energy to said gas stream at approximately constant pressure after exit from said recuperator (20); a heat
(Continued)

source (40) and a means (45) for transferring heat energy from said heat source (40) to said heater (25); a cooler (35) to cool said gas stream prior to compression in said compressor; a heat energy transfer device to transfer heat from aid cooler (35) to the environment; an operability device to ensure the operation of said compressor and said expander, and to take off surplus power either mechanically or electrically; a plurality of insulated ducts to transfer said gas stream between said compressor (15), recuperator (20), heater (25), expander (30) and cooler (35).

13 Claims, 6 Drawing Sheets (51) Int. Cl.
*F02G 1/055* (2006.01)
*F02G 1/057* (2006.01)

(58) Field of Classification Search
USPC .......................................... 60/650, 682–684
See application file for complete search history.

(56) References Cited

U.S. PATENT DOCUMENTS

| | | | | |
|---|---|---|---|---|
| 5,590,528 | A | | 1/1997 | Viteri |
| 5,924,305 | A | * | 7/1999 | Hill ............................. F25B 9/14 62/467 |
| 6,012,280 | A | * | 1/2000 | Hufton ....................... F01P 1/08 60/39.63 |
| 7,926,276 | B1 | | 4/2011 | Dunn |
| 9,551,219 | B2 | * | 1/2017 | Howes .................... F01B 17/02 |
| 2006/0248886 | A1 | * | 11/2006 | Ma ........................... F04B 25/00 60/517 |
| 2008/0276615 | A1 | | 11/2008 | Bennett |
| 2010/0218500 | A1 | * | 9/2010 | Ruer ....................... F02G 1/044 60/659 |
| 2010/0251711 | A1 | * | 10/2010 | Howes ..................... F01K 3/12 60/659 |
| 2014/0007569 | A1 | | 1/2014 | Gayton |
| 2015/0176526 | A1 | | 6/2015 | Frazier et al. |

OTHER PUBLICATIONS

Supplemental European Search Report cited in EP 18 84 3185 dated Apr. 22, 2021, 9 pages.

* cited by examiner

EFFICIENT HEAT RECOVERY ENGINE

Cross Reference to Related Application

This application is a 35 U.S.C. 371 National Phase Entry Application from PCT/AU2018/000129, filed Aug. 6, 2018 and designating the United States, which claims the benefit of Australian Patent Application Nos. 2017903172 filed on Aug. 9, 2017 and 2018901380 filed on Apr. 26, 2018, the disclosures of which are incorporated herein in their entireties by reference.

FIELD

The present invention relates to power generation via improved systems featuring Brayton-cycle gas engines with recuperation of engine exhaust heat.

BACKGROUND

As public concern grows about release of carbon dioxide into the atmosphere and depletion of fossil fuels, ever more emphasis is placed on energy efficiency, use of renewable energy and better use of available resources. Other important considerations are to reduce the capital cost of power generation equipment and to avoid unwanted environmental or societal impacts. It is desirable to develop efficient engines that can be powered by widely available heat sources, such as waste industrial process heat, engine exhaust heat, biogas from anaerobic digestion, landfill gas, biomass combustion, solar thermal power or the like. Such devices are generally called heat recovery engines.

Almost all heat recovery engines are based on the Rankine cycle, either with steam or an organic fluid as the working medium. The steam Rankine cycle is reliable and extremely well-established, but nonetheless has shortcomings. These include very high operating pressures, high operating temperatures, and the need to condense exhaust steam to water, which is especially power-sapping if air cooling is employed. Moreover, the efficiency of the steam Rankine cycle is not high unless sophisticated enhancements are used. Such enhancements include operation at supercritical pressures, feedwater pre-heating by steam bleed-off, and steam re-heat followed by secondary expansion. These attributes mean the specific capital cost of steam Rankine-cycle systems is high and they are mainly used at utility scale, typically 100 MW or more.

The organic Rankine cycle is generally employed when the available heat source is in the range 100-300° C., and almost entirely at sub-utility scale. Again the technology is mature, but shortcomings still exist. These include the use of working organic materials that variously might be toxic, contributing to the greenhouse effect, expensive, or with undesirable thermo-physical properties. Moreover, the efficiency of pumps and turbo-expanders is not high at sub-utility scale. The selection of the working medium will depend on the available boiling and condensing temperatures, and condensation takes place in a relatively narrow temperature range, which unavoidably means that condensers have a substantial auxiliary power requirement.

Another possibility for heat recovery engines is the Stirling cycle, which in theory has Carnot efficiency. The Stirling cycle is available in several configurations, notably alpha-, beta- and gamma-types. All varieties have practical limitations because of the need for internal heat exchange components that have high effectiveness and large surface area, yet with negligible dead space and minimal internal irreversibilities. These design constraints typically mean that Stirling engines have high specific cost, whilst transient heat transfer losses mean their efficiency is significantly sub-Carnot. Consequently, Stirling engines capture only niche markets compared to the widespread adoption of Rankine-cycle systems.

The Brayton-cycle engine (sometimes known as the Joule engine) is another type of heat recovery engine. Brayton's patent from 1872 (U.S. Pat. No. 125,166) was for an open-cycle piston-cylinder device powered by the combustion of liquid or gaseous fuels. In its basic form, air was compressed in one cylinder, combustion occurred in an intermediate vessel at approximately constant pressure, and heated air and combustion products were expanded in a second cylinder. Brayton's engines were used for mechanical power generation, notably for propulsion of an early submarine.

Brayton's concept had been previously considered by others. The first to propose a basic form of the Brayton cycle was Barber, whose 1791 patent (UK 1,833) proposed a sound principle, although not one that was workable given the technology of the day. Another version was patented by William Siemens in 1860 (UK 2,074), although his four-cylinder device never progressed beyond the experimental stage.

An early patent relating to the Brayton cycle was that of Ericsson in 1833 (UK 6,409) for a closed-loop predecessor of Brayton's 1872 patent, additionally featuring recuperation of exhaust heat. The recuperator, or regenerator or economiser as sometimes known, had been introduced in Stirling's 1816 patent (UK 4,081), which was for a valveless hot air engine. Ericsson's engine was known as a caloric engine, according to the caloric theory of heat (caloric: an invisible self-repelling substance) that was accepted at the time. Ericsson went on to develop numerous hot air and steam engines, and the inventions by which he is best known date from his patents in the 1850s in which he introduced features to reduce temperature variation during compression and expansion, that is to make compression and expansion as isothermal (constant temperature) as possible. Ericsson's 1856 patent (U.S. Pat. No. 14,690) was for an open-cycle recuperated piston-cylinder engine with only one cylinder, and compression and expansion chambers on either side of a single piston. The success or otherwise of this concept relies on accurate use of dead space on the compressor chamber. If insufficient dead space is used, the exhaust from the expansion chamber is at elevated pressure, thereby wasting energy. Conversely if too much dead space is used, the exhaust from the expansion chamber will be sub-atmospheric, again wasting energy. The fact that Ericsson dispensed with the single piston variant indicates that he was unable to control the dead space sufficiently accurately. Further, this 1856 patent was for an open-circuit engine with air intake at ambient pressure, which meant forgoing benefits of a pressurised closed circuit, namely greater power density and reduced internal pressure losses through various components in the engine.

A related development is that of furnace engines, which were open-cycle, piston-cylinder engines with routing of compressed air through external pressurised furnaces, usually coal-fired. Many such engines were built in the nineteenth century, with Cayley generally accredited as the earliest proponent (1807). These engines were highly susceptible to fouling, which is the unwanted buildup of material on surfaces within the engine.

Subsequent to 1872, Brayton's piston-cylinder combustion engine was ultimately unsuccessful in the face of rapid development of the Otto and Diesel cycles. From the 1940s onwards, development of the Brayton-cycle engine was in the form of turbomachinery, initially for aviation and then also for power generation.

Brayton-cycle heat recovery engines have been studied in turbomachinery for many years. In US patent 20070256424 (Heat Recovery Gas Turbine in Combined Brayton Cycle Power Generation), Briesch et al. disclose a heat recovery Brayton-cycle turbine that acts as a bottoming cycle for a conventional open-cycle gas turbine. Such turbomachinery heat recovery devices are adversely affected by compression and expansion losses, are unrecuperated, typically operate at pressure ratios between 4 and 6, and the power output and efficiency are barely acceptable unless the peak temperature in the system is high, at least 500° C. This limitation also applies to the concept of Poirier et al. in U.S. Pat. No. 4,215,553 who proposed solar thermal power generation via recuperated Brayton-cycle turbomachinery engines operating at low pressure ratios.

Another possible architecture for the Brayton-cycle engine is based on a free-piston concept, as presented by Mikalsen and Roskilly, WO 2010/116172. They correctly observe that piston-cylinder Brayton-cycle engines have a high sensitivity to frictional losses in the drivetrain, which are absent in their free-piston approach. The principal limitation of the free-piston approach is in control of the piston, since there is always the risk of "overstroking", with potentially serious consequences. Thus free-piston engines require elaborate and expensive control mechanisms, which are better avoided if possible.

Most piston-cylinder Brayton-cycle engines have valves, which is an important difference to Stirling engines as mentioned earlier. In some cases, control of the valve operation can be used to control the output of the engine, as described for example by Rampen and Costello in publication WO 2011/018663. Variable valve operations may bring benefits in the form of flexible engine output, but also rely on extensive use of sensors and valves with variable operating schedules. Simplicity is lost with such an approach.

In U.S. 2008/0276615, Bennett describes a new type of valve for piston-cylinder Brayton-cycle engines, perhaps closed-loop and perhaps recuperated. Bennett's valve uses harmonic oscillations about an unstressed position, so as to reach full valve closure or full valve opening at the end points of the harmonic oscillation. In this concept, camshafts are not required, but there is a need for a fast-acting latching mechanism to hold the valve at particular stages of the harmonic cycle. Rapid wear of this latching mechanism can be expected. Bennett also introduces shunts and accumulators so as to reduce pressure fluctuations in single cylinder Brayton-cycle engines. These fluctuations are not so important for multi-cylinder engines, particularly when recuperated, in which case significant volumes of gas are distributed around the various components in the engine.

Accordingly, there is a need for a heat recovery engine that can operate with good efficiency over an accessible temperature range (150-600° C.), and at pressures no greater than 20 bar. Desirable features would include simplicity, compactness, minimal frictional losses, air cooling, avoidance of undesirable or expensive working materials, minimal internal irreversibilities, and the capability to be deployed singly at from 10 kW to 1 MW scale and in modular fashion up to utility scale. Also desirable would be the capacity to exploit a range of heat sources such as, but not limited to, waste industrial process heat, engine exhaust heat, biogas from anaerobic digestion, landfill gas, biomass combustion, geothermal energy, concentrated solar thermal energy and nuclear energy, together with thermal storage, either latent or sensible.

OBJECT OF THE INVENTION

It is an object of the present invention to substantially overcome or at least ameliorate one or more of the disadvantages of the prior art, or at least provide a useful alternative.

SUMMARY OF INVENTION

An aspect of the present invention provides a heat recovery engine including:
a compressor to increase pressure, density and temperature of a gas stream flowing in a closed loop within the engine, with the gas stream at base system pressure at a compressor inlet;
an expander to reduce the pressure of said gas stream when compressed to just above said base system pressure, at the same time receiving power from the gas stream;
a recuperator to transfer thermal energy from downstream gas stream of said expander to downstream gas stream of said compressor, thereby increasing the temperature of said downstream gas stream of said compressor at approximately constant pressure;
a heater to provide further heat energy to said gas stream at approximately constant pressure after exit from said recuperator;
a heat source and a heating device for transferring heat energy from said heat source to said heater;
a cooler to cool said gas stream prior to compression in said compressor;
a heat energy transfer device to transfer heat from said cooler to the environment;
an operability device to ensure the operation of said compressor and said expander, and to take off surplus power either mechanically or electrically;
a plurality of insulated ducts to transfer said gas stream between said compressor, recuperator, heater, expander and cooler.

Preferably, said heat recovery engine operates with a low compressor pressure ratio, which is fixed.

Preferably, said compressor and expander are positive displacement devices.

Preferably, said positive displacement devices have a piston-cylinder mechanism, with a plurality of cylinders and pistons.

Preferably, said piston-cylinder mechanism is double-acting in the cylinders through use of chambers on both sides of the piston.

Preferably, said piston-cylinder mechanism has pairwise direct linkages between said compressor and said expander.

Preferably, said piston-cylinder mechanism has a crosshead mechanism to laterally constrain a connecting rod joining a crankshaft to a piston rod of the piston.

Preferably, said direct linkages are selected for mass and speed of operation so that as much of the compressor workload as possible is met directly by the pistons, without recourse to torques applied by the crankshaft.

Preferably, valves in said piston-cylinder mechanism are operated by camshafts on the cylinders of the expander.

Preferably, said piston-cylinder mechanism includes a cooling mechanism to prevent piston rings seizing.

Preferably, said cooling mechanism includes insulating crown extensions extending into the chamber for expansion from the piston.

Preferably, said double-acting piston-cylinder mechanism is operable within a single cylinder of constant radius, with compression on one side of the piston and expansion on the other side of the piston, with substantial optimised dead space in the chamber for compression.

Preferably, said heat source is provided by stored latent or sensible thermal energy, combustion of biogas from anaerobic digestion or landfill gas, combustion of biomass, waste industrial process heat, engine exhaust heat, geothermal energy or concentrated solar thermal energy.

A process of converting heat energy to electrical energy preferably the heat recovery engine is used.

BRIEF DESCRIPTION OF THE DRAWINGS

Preferred embodiments of the present invention will now be described, by way of example only, with reference to the accompanying drawings, in which.

DESCRIPTION OF EMBODIMENTS

Figure 1:
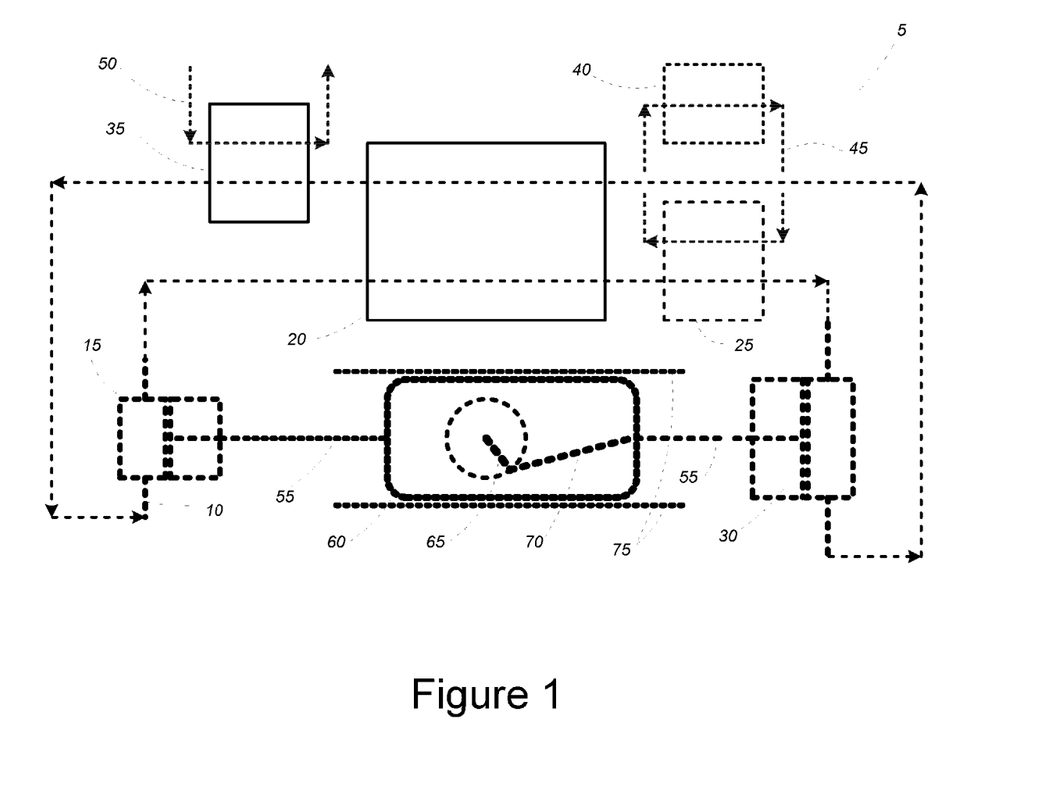
FIG. 1 is a schematic view of a flow-sheet for the heat recovery engine.

Referring to FIG. 1, there is disclosed herein a closed-circuit recuperated piston-cylinder Brayton-cycle heat recovery engine 5. A gas stream at base system pressure 10 is compressed by a compressor 15, so increasing the pressure and temperature of the gas stream. The gas stream exiting the compressor 15 is transferred to a recuperator 20 so as to receive thermal energy from the gas stream exiting the expander 30. In the recuperator 20 the temperature of the gas stream exiting the compressor 15 is raised at approximately constant pressure. The gas stream exiting the recuperator 20 is transferred to a heater 25 in which the temperature is raised at approximately constant pressure to peak operating temperature. The gas stream exiting the heater 25 is transferred to expander 30 in which expansion takes place and the pressure of the gas stream is lowered to just above base system pressure and the temperature and density are also lowered. The gas stream exiting the expander 30 is transferred to the recuperator 20 where, as noted, thermal energy in the expander exhaust stream is transferred to the gas stream exiting the compressor 15. To complete the circuit, the gas stream exiting the recuperator 20 is transferred to the cooler 35 where the temperature is lowered at approximately base system pressure.

The flow-sheet has a heat source 40 and a heating device 45 to transfer heat from this heat source to the heater 25. It is noted that there are many possibilities for the heat source 40 and heating device 45, including but not limited to stored latent or sensible heat, combustion of waste gas such as biogas or landfill gas, combustion of biomass, waste industrial process heat, engine exhaust heat, geothermal energy and concentrated solar thermal energy. Also cooler 35 is cooled by cooling device 50, which might involve liquid or air cooling, and would also involve cooling below ambient temperature if inlet chilling is applied.

The compressor 15 and the expander 30 are positive displacement devices, typically but not necessarily piston-cylinder, so as to maintain compression and expansion losses at an acceptably low level. It should be noted that preference to piston-cylinder devices herein is by way of example only and does not preclude other possibilities for positive displacement devices. The pistons in the compressor 15 and expander 30 are connected via piston rods 55 to a rigid connection mechanism 60 that is operated in reciprocal fashion by a crankshaft 65 and connecting rod 70. The crankshaft 65 maintains the operation of the compressor 15 and expander 30 and also takes off surplus power generated in the cycle.

The working gas stream 10 enters the compressor 15 and the expander 30, which can be either single-acting or double-acting, via valves that are not shown in FIG. 1. For reasons explained below, these valves (and particularly the inlet valves on the expander cylinders) open and close at fixed points during each engine revolution, for example as operated by a camshaft (not shown).

The rigid connection mechanism 60 is constrained to move in reciprocating fashion by crosshead guides 75 featuring lubrication or other measures to minimise frictional losses associated with reciprocal motion. By virtue of this construction there are minimal lateral forces between the pistons and cylinder walls, and frictional losses are thereby reduced. Moreover, the mass of the reciprocating components and the speed of operation can be selected so that the compressor workload is met directly by the output from the piston in the expander. This is so that no matter what positive displacement mechanism is adopted, with a minimal requirement there will be a direct connection between expander and compressor. In a piston-cylinder embodiment as illustrated in FIG. 1, the piston in expander 30 is acted on by pressure forces and picks up kinetic energy at the same time that force transmitted through rigid connection mechanism 60 causes the motion of the piston in compressor 15. Surplus kinetic energy in the connection mechanism can be used to complete the compression stroke, without the need for any driving moment through the crankshaft 65. Indeed, in an optimal configuration, crankshaft 65 merely takes off surplus power in the cycle. The mechanism shown also allows for lubrication to be confined to the rigid connection mechanism 60, crankshaft 65, connecting rod 70 and crosshead guides 75, all of which would be enclosed within a container not shown in FIG. 1. Any oil remaining on the piston rods on exit from this container can be scraped away by passing the piston rods through tight-fitting circular openings (scrapers). By means of the container and associated scrapers, compressor 15 and expander 30 can be oil-free.

Recuperation relies on the fact that the exhaust temperature from expander 30 is greater than the temperature of the gas stream exiting the compressor 15. This will occur if the pressure ratio of the compressor is sufficiently low. The benefit of recuperation is a reduced heating requirement in heater 25 and therefore greater thermal-mechanical efficiency.

The heat recovery engine 5 operates on a closed-loop flow-sheet, which means that the base system pressure can be substantial. This has the benefit that high power output can be achieved from compact engines and also reduces the importance of inevitable pressure losses in all components. Further, use of a closed-loop flow-sheet allows the working gas to be selected which is an advantage. Air or nitrogen would be suitable selections since they are naturally occurring, non-toxic and readily available. Another possibility would be carbon dioxide, especially since supercritical compression at ambient temperatures would then be available if the base system pressure were sufficiently high. It should however be appreciated that other gases could be utilised.

There is another significant benefit of operating on a closed-loop flow-sheet, namely that the valves on the expander can be driven by a camshaft. To explain, first consider the case of an open-loop flow-sheet. Clearly the gas pressure at completion of the expansion cycle must be at least ambient, since the gas is to be discharged to the atmosphere. However, it is not desirable for the gas pressure to be above ambient, since that would represent a waste of enthalpy. In the open-loop case, the twin requirements of (1) conservation of mass throughput and (2) ambient exit pressure can be met by varying the closing point of the inlet valves on the expander so as to vary the compression ratio of the overall system as the peak gas temperature varies. (The outlet valves on the expander will always be open on the return stroke of the two-stroke operation.) However, in a closed-loop flow-sheet, variable control of the inlet valves of the compressor is not necessary, even when the gas temperature deviates from the design point. It can be shown mathematically from the thermodynamic state equations of the system that as the peak gas temperature varies, but with fixed valve settings, the base system pressure will adapt so as to achieve a new operating equilibrium in which the compressor pressure ratio will remain unchanged. The same applies for variations in the temperature achieved by the cooler 35. This means that the valves on the expander can be controlled by a camshaft with fixed settings, which is simpler and cheaper to implement than a procedure in which the closing point of the inlet valves of the expander needs to be actively controlled. It is also possible to operate valves on the compressor by a camshaft mechanism if this leads to reduced pressure losses compared to passive valve mechanisms.

To reduce pressure and thermal losses, ducts connecting compressor 15, recuperator 20, heater 25, expander 30, recuperator 20 and cooler 35 are of generous cross-section, insulated and with a minimum of bends. Similarly recuperator 20, heater 25 and cooler 35 must be designed for high heat transfer effectiveness and minimal pressure losses. Another important design consideration is to minimise dead spaces in expander 30 since it can be shown that such dead spaces on the expander contribute to loss of performance.

With the flow-sheet that has been described in FIG. 1, there is a natural hierarchy of temperatures, now described by reference to a baseline example in which the working gas is nitrogen, the maximum gas temperature achieved by the heater is 350° C., the compressor pressure ratio is 1.75, compression and expansion are isentropic, the temperature of the gas stream at compressor inlet is 25° C., recuperation is 95% effective and there are no other thermal, pressure or mechanical losses in the flow-sheet. The specific heat capacity of nitrogen is assumed constant at the value for 300 K and calculations are made using the dry-air-standard model of the Brayton thermodynamic cycle. In this example, the specific work output is 41.9 kJ per kg of nitrogen throughput and the recuperated thermal-mechanical efficiency is 0.399. The temperatures at various stages of the thermodynamic cycle are 25° C. (inlet), 76.5° C. (compressor outlet), 249.1° C. (recuperator outlet before heater), 350° C. (after heater), 258.2° C. (expander outlet) and 85.6° C. (recuperator outlet before cooler). In the absence of recuperation, the thermal-mechanical efficiency would be 0.147.

If applied, inlet chilling improves the performance of the heat recovery engine. For example, suppose just one modification is made to the above baseline case, namely that the temperature of the gas stream at the compressor inlet is set at 15° C. This reduces the compression workload and increases the specific work output by 4.3% to 43.7 kJ per kg of nitrogen throughput. At the same time, the recuperated efficiency increases to 0.414. If the temperature of the gas stream at compressor inlet is reduced further to 5° C., then the specific work output and efficiency are 45.5 kJ per kg of nitrogen throughput (8.6% more than in the baseline case) and 0.429 respectively. At constant revolutions of the engine, inlet chilling would increase the power output commensurately more than indicated above since the working gas density at the compressor inlet would also be increased.

The importance of a positive displacement mechanism can be seen from the following variations to the baseline case. Suppose the adiabatic efficiency of compression and expansion are both set at 0.85, as would be typical for small turbomachinery. The specific work output is then 18.1 kJ per kg of nitrogen throughput and the recuperated and unrecuperated thermal-mechanical efficiencies are 0.200 and 0.066 respectively. At high peak temperatures, the efficiency of unrecuperated Brayton-cycle engines increases as the compressor pressure ratio is increased. However at 350° C. peak gas temperature and 85% adiabatic efficiency of compression and expansion, increasing the pressure ratio actually decreases the efficiency and specific power output, to such an extent that at pressure ratio 3.75 recuperation gives no benefit and at pressure ratio 4.2, the power output of the unrecuperated system falls to zero. In summary, the use of turbomachinery with the Brayton cycle is only feasible with high peak gas temperatures, particularly for devices at sub-utility scale.

To achieve a high thermal-mechanical efficiency requires that the recuperator be highly effective. For example, if the baseline case is modified by use of a recuperator at either 0.90 or 0.85 effectiveness, the overall thermal-mechanical efficiency drops to 0.366 and 0.338 respectively.

Figure 2:
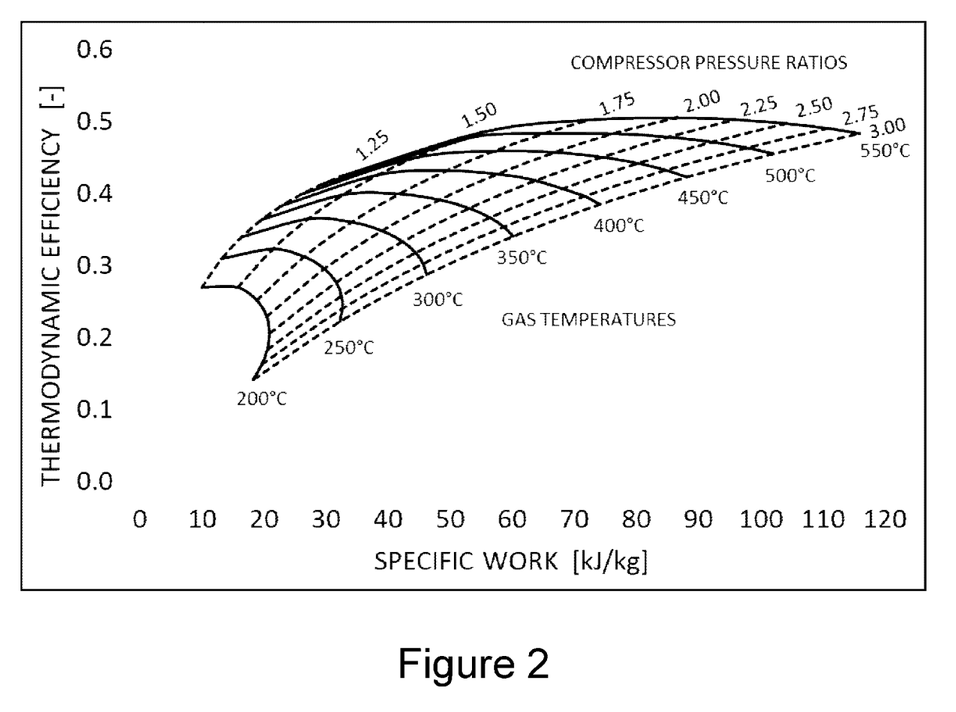
FIG. 2 is a chart displaying the output of the heat recovery engine as a function of compressor pressure ratio and working gas temperature.

The performance of a preferred embodiment of the heat recovery engine as peak gas temperature and compressor pressure ratio vary is shown in FIG. 2. The basis of the calculation is unchanged, the working gas is nitrogen and other assumptions are use of ideal gas theory with constant specific heat capacities at 300 K, isentropic compression and expansion, recuperator effectiveness at 95% and compressor inlet temperature 25° C. For a given compressor pressure ratio, the efficiency and specific work output always increase with peak temperature. For a given peak temperature, the efficiency increases as the pressure ratio decreases to about 1.75; thereafter recuperator losses mean that the efficiency actually worsens. For a given peak temperature, reduction in the pressure ratio is almost always accompanied by a reduction in specific work, except for very low gas temperatures.

The heat recovery engine described here has a high back-work ratio (ratio of work expended by compressor divided by work received by expander). Features described above in relation to a direct connection between compressor and expander show how frictional losses associated with compression and expansion can be kept to a minimum. The positive displacement mechanism also ensures that compression and expansion losses associated with turbomachinery are avoided. The heat recovery engine will however be subject to thermal losses, particularly in expander cylinders, which will now be discussed.

Figure 3:
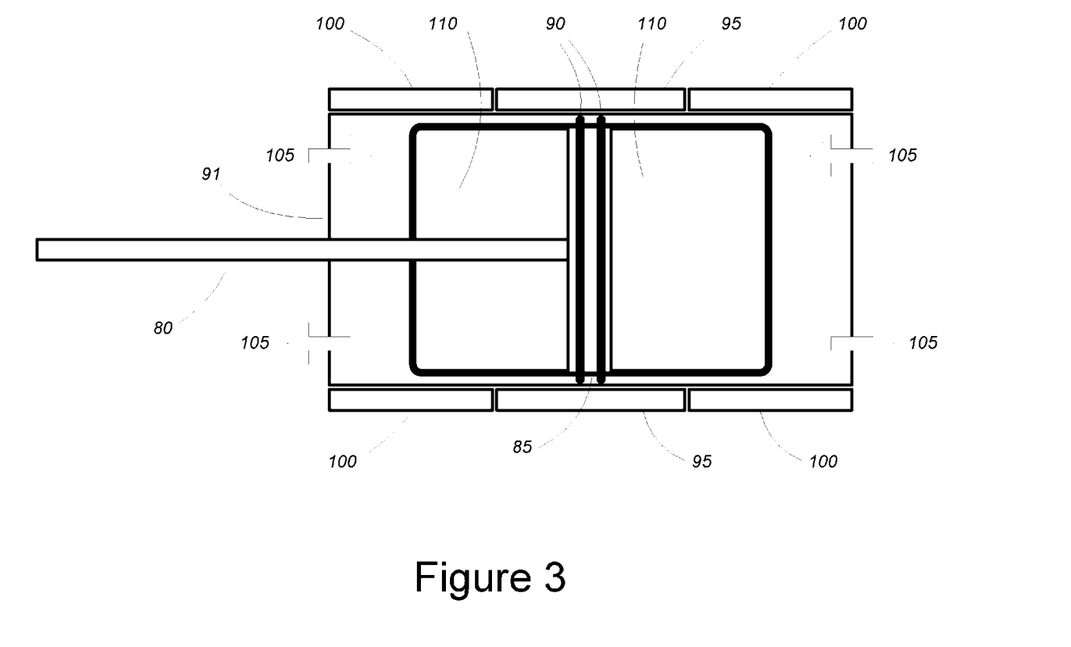
FIG. 3 is a schematic view of the mid-cylinder cooling zone on expansion cylinders, together with piston crown extensions.

Referring to FIG. 3, there is disclosed herein a means to reduce thermal losses from the cylinders of expander 30, which are now assumed to be double-acting. Piston rod 80 is connected to piston 85 with piston rings 90. To achieve a tight seal without seizing at the high temperatures that will occur in the cylinder 91 of the expander 30, a mid-cylinder cooling zone 95 is introduced. Typically this mid-cylinder cooling zone will be achieved by circulating cooling water through ducts in the cylinder walls. These ducts would be localised to the middle of the cylinder, in the region where the piston rings make contact with the cylinder walls. Elsewhere, insulation 100 is applied to the remaining surfaces of the cylinder including, even though not shown in FIG. 3, the cylinder heads with valve assemblies 105. Finally insulating crown extensions 110 are mounted on piston 85. The overall effect is to minimise heat transfer from hot parts of the cylinder walls (at the cylinder heads and adjacent to insulated regions) to the cooling zone 95, and at the same time allowing piston rings 90 to be a tight fit without seizing. Heat transfer losses will be minimised by using a material with low thermal conductivity (such as ceramic or glass) to make the crown extensions and ensuring that free space between the crown extensions and cylinder walls is kept to a minimum.

Two further specific practical challenges need to be addressed by a heat recovery engine with double-acting expander pistons, as illustrated in FIG. 3. The first occurs where piston rod 80 passes through the cylinder 91 of the expander. In an engine with a high base system pressure, peak pressures in the expander might be 20 bar; moreover expander temperatures would be high and the piston rod might move at substantial speed. Under these conditions of pressure, temperature and speed, it can be expected that the seal where piston rod 80 passes through the cylinder 91 of the expander will need careful attention. The second challenge is to use an expander valve design that is leak-free as far as possible, since any leaks will involve a loss of mechanical and thermal energy.

A non-limiting example is now given to demonstrate the usefulness of the engine in a preferred embodiment for producing electricity from waste combustible gas, such as biogas from anaerobic digestion. Suppose that the engine is to have design capacity of approximately 125 kW and that heat is sourced from combustion of flare gas so that the peak gas temperature in the circuit is 450° C. In this example, the working gas is now selected as air with pre-compressor temperature 25° C., base system pressure 900 kPa and compressor pressure ratio 1.90. The model is similar to that used in the earlier baseline case, although polytropic compression and expansion are now used (polytropic index 1.20 for compression, 1.40 for expansion) and realistic allowance is made for dead space (0.06 of compressor volume pre-compression), 0.10 of expander volume pre-expansion. The recuperator effectiveness is now assumed to be 92% and the following pressure losses are assumed: compressor valves 10 kPa for both inlet and outlet, expander valves 10 kPa for both inlet and outlet, high-pressure components 5 kPa, low-pressure components 5 kPa.

Under the above assumptions, the specific compressor workload is 59.6 kJ/kg, the specific expander output is 113.9 kJ/kg, for nett specific work output 54.3 ld/kg. The recuperated efficiency is 0.389.

Figure 4:
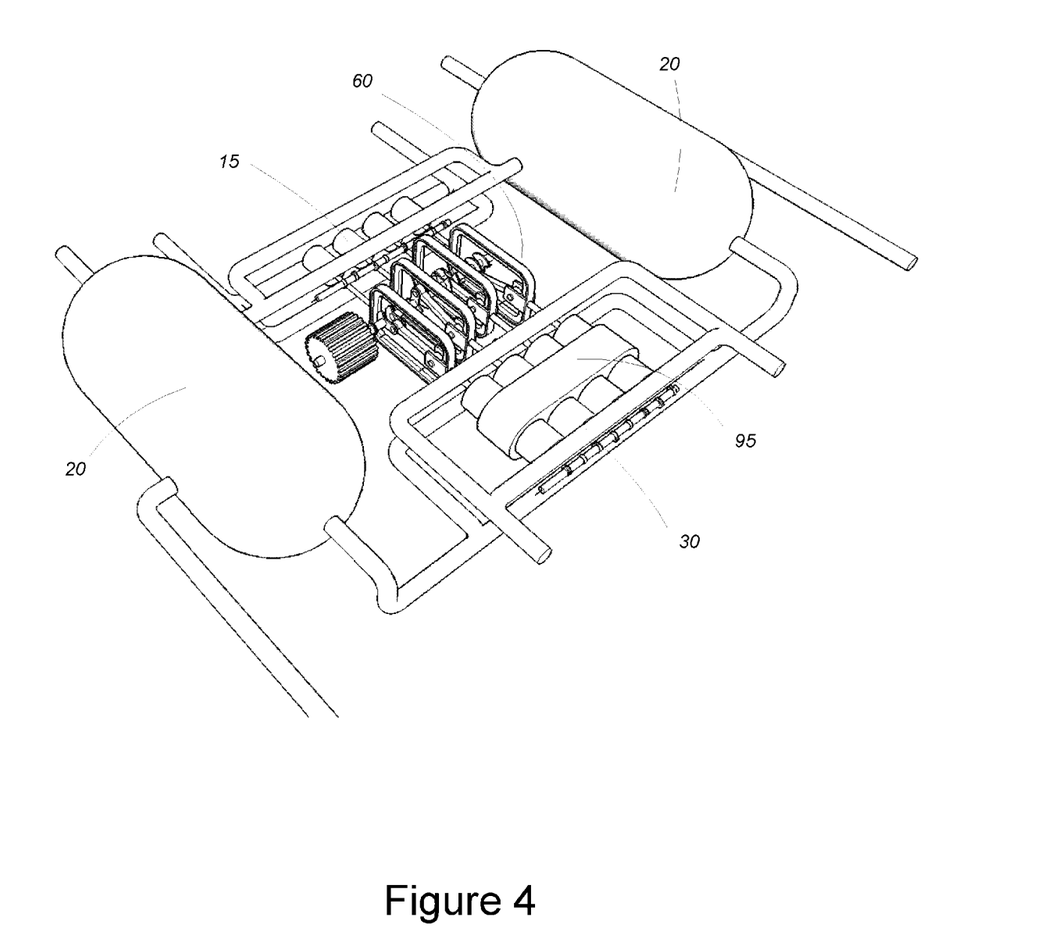
FIG. 4 is a drawing of a 125 kW heat recovery engine with all valves operated by crankshafts and in which there is a direct mechanical connection between compressor and expander pistons.

Referring to FIG. 4, there is disclosed herein an engine of a preferred embodiment with four double-acting compressor cylinders 15, horizontally opposed to four double-acting expander cylinders 30, and with a pairwise rigid mechanical connection 60 between piston rods for compressor and expander. The heater and cooler are not shown, and the two large bulbous shapes comprise the recuperator 20. The recuperator has been split into two components for convenience of design, but other layouts would be possible. The stroke is 170 mm and the bores are 160 mm (compressor) and 220 mm (expander). In this embodiment, all valves are operated by camshafts, although it would also be possible for compressor valves to be passive. With an operating speed of 10 Hz, the air mass flow-rate at the design point is 2.71 kg/s. According to the thermodynamic model, this engine would produce 147 kW mechanical output prior to any other losses. Amongst these losses are frictional losses in the drivetrain, which can certainly be reduced by optimal selection of the mass of the reciprocating components as mentioned earlier.

Compression and expansion in the engine in FIG. 4 is oil-free, and any lubrication is confined to the crankshaft, bearings, connecting rods, mechanical connection and crosshead guides. To ensure that piston rings in the expander do not seize at high operating temperatures, a mid-cylinder cooling zone 95 is introduced in the expansion cylinders, as described in relation to FIG. 3. This mid-cylinder cooling zone is assisted by the introduction of insulating crown extensions (not shown in FIG. 4) on the expander pistons.

The designs shown in FIGS. 1 and 4 envisage that the cylinders in the compressor and expander cylinders, whether single- or double-acting, have different diameters. For embodiments such as the baseline case described earlier, the volume flux (e.g. in litres per second) of hot gas exiting the expander is substantially greater than the volume flux of cold gas entering the compressor. Thus although the compressor and expander have the same stroke, as enforced by the use of a rigid mechanical connection between compressor and expander pistons, the diameter of the expander cylinder is substantially larger than the diameter of the compressor cylinder. This is not always necessary. In particular, the expander and compressor chambers can have the same diameter and same stroke, provided that the compression chamber includes substantial dead space. This embodiment is now described.

Figure 5:
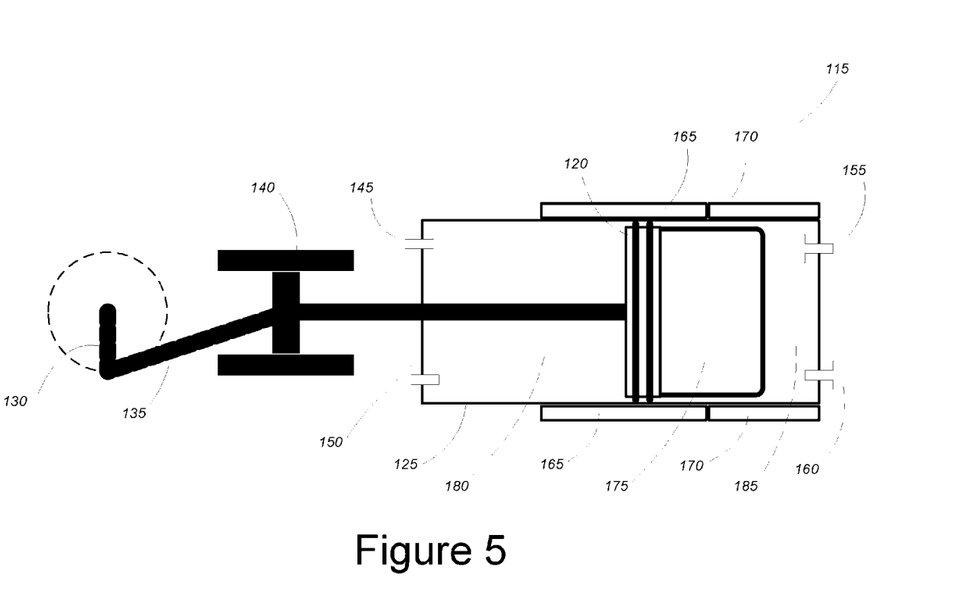
FIG. 5 is a schematic view of an engine in which compression and expansion take place on opposite sides of a piston that moves in a cylinder of constant radius, with substantial dead space included in the compression chamber.

Referring to FIG. 5, there is disclosed herein a mechanism 115 for a double-acting piston-cylinder Brayton-cycle heat recovery engine, in which the compression and expansion chambers are on opposite sides of a piston 120 that moves with a fixed stroke in a cylinder 125 of constant diameter. Features of this mechanism that have already been discussed include crank 130, connecting rod 135, crosshead supports 140, compressor inlet valves 145, compressor outlet valves 150, expander inlet valves 155, expander outlet valves 160, mid-cylinder cooling region 165, insulation 170 and insulating piston crown extension 175. Compression chamber 180 includes a substantial dead space, whereas the dead space in expansion chamber 185 is as small as possible.

Figure 6:
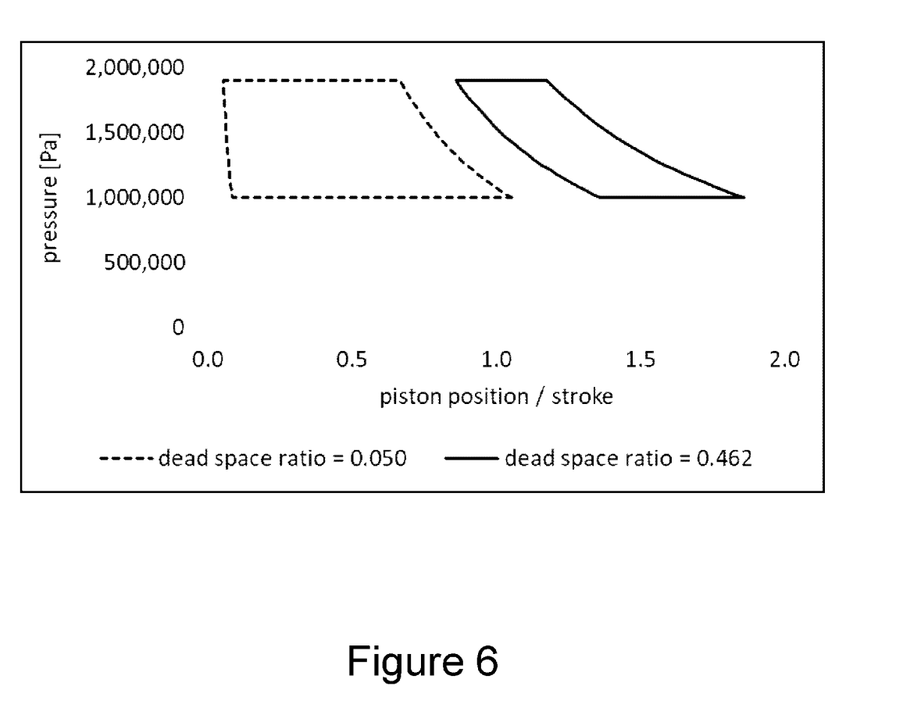
FIG. 6 is a chart displaying P-V diagrams for two compression processes, one with minimal dead space and the other with substantial dead space.

As mentioned earlier, the volume flux ex-expander is substantially larger, perhaps double, the volume flux into the compressor. This can be achieved with the mechanism shown in FIG. 5 with judicious use of dead space, as illustrated by the two P-V plots in FIG. 6, one with minimal dead space and the other with substantial dead space as measured by the dead space ratio—that is the ratio of dead space to total capacity of the compressor chamber. In FIG. 6, the two P-V plots have a dead space ratio of 0.050 and 0.462 respectively, the working gas is air, the inlet air pressure is 1 MPa absolute, the compressor pressure ratio is 1.9 and the polytropic power law index for compression is 1.4. The volumetric efficiency (volume of air delivered compared to what would be delivered with zero dead space) for the two P-V plots is 0.969 and 0.500 respectively. The latter case represents a judicious use of dead space so that the expander and compressor chambers can have the same bore and stroke, yet the compressor inlet volume flux is half the outlet volume flux of the expander, as approximately required in the baseline case discussed earlier.

The geometry of the dead space illustrated in FIG. 5 is not restricted to lengthwise extension of a uniform cylinder. Other geometries are possible as would be readily recognised by a person skilled in the art.

In summary, the operation of at least a preferred embodiment of the Brayton cycle underlying engine 5 (FIG. 1) is assisted by the features that have been described above. The use of a positive displacement method for compression and expansion means fewer compression and expansion losses than would occur with typical turbomachinery. Operation at a low pressure ratio means that recuperation of thermal energy in gas exiting the expander will be effective and the overall thermal-mechanical efficiency will be high. The use of a closed-loop flow-sheet with high base system pressure means that the volumetric power density of the engine will be high and unavoidable pressure drops throughout the flow-sheet will not have severe consequences. The closed-loop flow-sheet also enables the inlet valves on a piston-cylinder expander to be driven by a camshaft, and with the compressor pressure ratio held constant. In other words, active control of valves is not required. The engine operates with a crosshead mechanism with a direct mechanical linkage between compressor and expander pistons. The design and operating conditions can be tuned so that all of the compressor workload can be met by the expander without loss-inducing involvement of the crank. Effective sealing of expansion pistons and reduced thermal losses can be achieved by mid-cylinder cooling and insulating crown extensions on expander pistons. These general benefits are supplemented by specific benefits in the case of the mechanism described in relation to FIG. 5—there is ample area for valves on the compressor and the point where the piston rod passes through the compressor head is cool.

Although the invention has been described with reference to specific embodiments, it will be appreciated by those skilled in the art that the invention may be embodied in other forms.

The invention claimed is:

1. A heat recovery engine including:
   a compressor to increase pressure, density and temperature of a gas stream flowing in a closed loop within the engine, with the gas stream at base system pressure at a compressor inlet;
   an expander to reduce the pressure of said gas stream when compressed to just above said base system pressure, at the same time receiving power from the gas stream;
   a recuperator to transfer thermal energy from downstream gas stream of said expander to downstream gas stream of said compressor, thereby increasing the temperature of said downstream gas stream of said compressor at approximately constant pressure;
   a heater to provide further heat energy to said gas stream at approximately constant pressure after exit from said recuperator;
   a heat source and a heating device for transferring heat energy from said heat source to said heater;
   a cooler to cool said gas stream prior to compression in said compressor;
   a heat energy transfer device to transfer heat from said cooler to the environment;
   an operability device to ensure the operation of said compressor and said expander, and to take off surplus power either mechanically or electrically; and
   a plurality of insulated ducts to transfer said gas stream between said compressor, recuperator, heater, expander and cooler,
   wherein said compressor and expander are positive displacement devices, and
   wherein the heat recovery engine does not include turbomachinery.

2. The heat recovery engine of claim 1, wherein said heat recovery engine operates with a low compressor pressure ratio, which is fixed.

3. The heat recovery engine of claim 1, wherein said positive displacement devices have a piston-cylinder mechanism, with a plurality of cylinders and pistons.

4. The heat recovery engine of claim 3, wherein said piston-cylinder mechanism is double-acting in the cylinders through use of chambers on both sides of the piston.

5. The heat recovery engine of claim 3, wherein said piston-cylinder mechanism has pairwise direct linkages between said compressor and said expander.

6. The heat recovery engine of claim 3, wherein said piston-cylinder mechanism has a crosshead mechanism to laterally constrain a connecting rod joining a crankshaft to a piston rod of the piston.

7. The heat recovery engine of claim 5, wherein said direct linkages are selected for mass and speed of operation so that as much of the compressor workload as possible is met directly by the pistons, without recourse to torques applied by the crankshaft.

8. The heat recovery engine of claim 3, wherein valves in said piston-cylinder mechanism are operated by camshafts on the cylinders of the expander.

9. The heat recovery engine of claim 3, wherein said piston-cylinder mechanism includes a cooling mechanism to prevent piston rings seizing.

10. The heat recovery engine of claim 9, wherein said cooling mechanism includes insulating crown extensions extending into the chamber for expansion from the piston.

11. The heat recovery engine of claim 4, wherein said double-acting piston-cylinder mechanism is operable within a single cylinder of constant radius, with compression on one side of the piston and expansion on the other side of the piston, with substantial optimised dead space in the chamber for compression.

12. The heat recovery engine of claim 1, wherein said heat source is provided by stored latent or sensible thermal energy, combustion of biogas from anaerobic digestion or landfill gas, combustion of biomass, waste industrial process heat, engine exhaust heat, geothermal energy or concentrated solar thermal energy.

13. A process of converting heat energy to electrical energy wherein the heat recovery engine of claim 1 is used.

* * * * *